(12) United States Patent
Hirata et al.

(10) Patent No.: US 11,451,173 B2
(45) Date of Patent: Sep. 20, 2022

(54) BOARD AND ELECTRONIC DEVICE INCLUDING BOARD

(71) Applicant: CANON KABUSHIKI KAISHA, Tokyo (JP)

(72) Inventors: Hiroki Hirata, Saitama (JP); Mitsuhiro Sugeta, Chiba (JP); Ryosuke Nanai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 9 days.

(21) Appl. No.: 17/196,281

(22) Filed: Mar. 9, 2021

(65) Prior Publication Data

US 2021/0288598 A1 Sep. 16, 2021

(30) Foreign Application Priority Data

Mar. 12, 2020 (JP) .............................. JP2020-043457

(51) Int. Cl.
*H02P 8/00* (2006.01)
*H02P 8/34* (2006.01)
*H02P 6/16* (2016.01)

(52) U.S. Cl.
CPC . *H02P 8/34* (2013.01); *H02P 6/16* (2013.01)

(58) Field of Classification Search
CPC .................................... H02P 8/34; H02P 6/16
See application file for complete search history.

(56) References Cited

U.S. PATENT DOCUMENTS

| 9,844,132 | B2 * | 12/2017 | Serizawa ............... G03G 15/50 |
| 2018/0351490 | A1 | 12/2018 | Sugamoto |
| 2018/0357197 | A1 | 12/2018 | Morone |
| 2019/0260316 | A1 | 8/2019 | Joji |
| 2021/0099116 | A1 | 4/2021 | Krishnamurthy |

FOREIGN PATENT DOCUMENTS

| CN | 102350877 A | * | 2/2012 |
| JP | 2009-176785 A | | 8/2009 |

* cited by examiner

*Primary Examiner* — Karen Masih
(74) *Attorney, Agent, or Firm* — Canon U.S.A., Inc. I.P. Division

(57) ABSTRACT

A board a motor driver control circuit, a first connector, a first wire, a second wire, a third wire, a fourth wire, a fifth wire, and a sixth wire. The motor driver control circuit includes a first H-bridge and a second H-bridge. The first connector is a connector to which an output from the first H-bridge and an output from the second H-bridge are input. The first wire and the second wire input the output from the first H-bridge to the first connector. The third wire and the fourth wire input the output from the second H-bridge to the first connector. The fifth wire is connected to the first wire and outputs the first H-bridge output to another connector. The sixth wire is connected to the second wire and outputs the first H-bridge output to the other connector.

13 Claims, 11 Drawing Sheets

[DRIVING WAVEFORMS OF DC MOTOR]

[DRIVING WAVEFORMS OF STEPPER MOTOR]

FIG.8A
|   | MODEL |
|---|---|
| L-LEVEL | COLOR PRINTER |
| H-LEVEL | MONOCHROME PRINTER |
FIG.8B
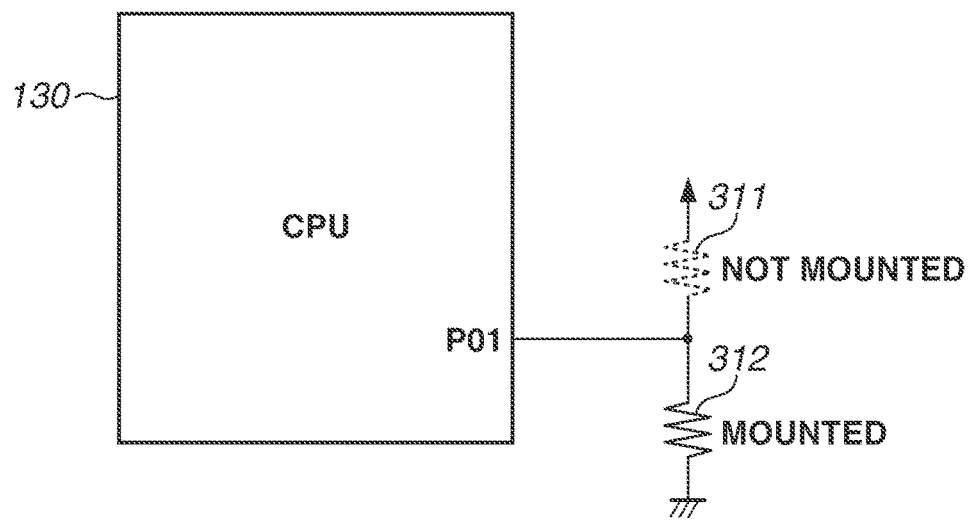
FIG.8C
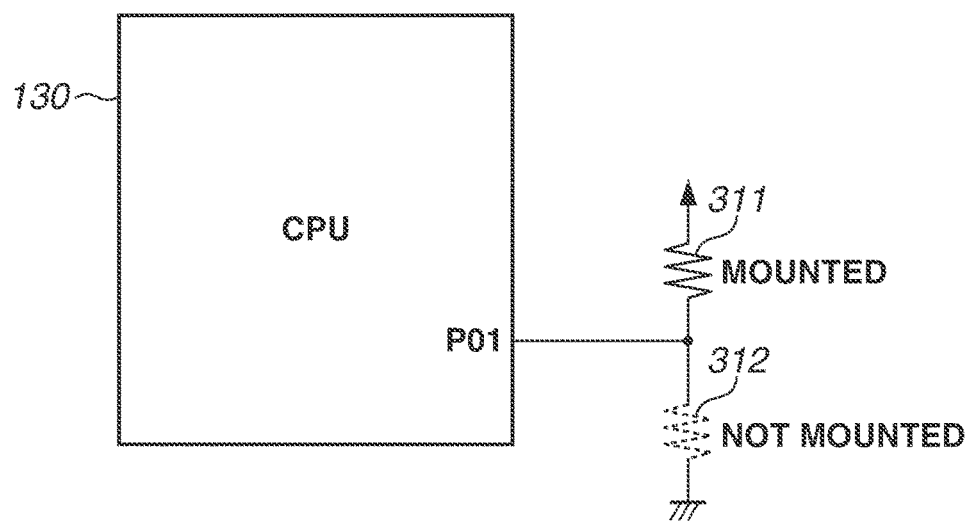

BOARD AND ELECTRONIC DEVICE INCLUDING BOARD

BACKGROUND

Field

The present disclosure relates to a board including a motor driver control circuit that controls the operation of a motor, and an electronic device including the board.

DESCRIPTION OF THE RELATED ART

Some electronic devices, such as printers, are sold as different models; the models include a common driver board for controlling loads, and some of the loads are removed or modified.

For example, a motor (e.g., a stepper motor) controlled by a driver board in a color printer and a motor (e.g., a direct current (DC) motor) controlled by a driver board in a monochrome printer may be different from each other. If the motor driver board of the color printer and the motor driver board of the monochrome printer are remodeled, the cost increases. Thus, the motor in the color printer and the motor in the monochrome printer need to be controlled on a common board. Japanese Patent Application Laid-Open No. 2009-176785 discusses an engine board in which the number of ports and the wiring structure are elaborated such that the engine board can connect to both a main board of a color printer and a main board of a monochrome printer.

In an engine board discussed in Japanese Patent Application Laid-Open No. 2009-176785, a port for connecting to a main board of an apparatus A including a color scanner and a wire that connects a second communication unit and the port are provided. This engine board can also connect to a main board of an apparatus B including a monochrome scanner, but the port and the wire are not used in a case where the engine board is connected to the main board of the apparatus B. In Japanese Patent Application Laid-Open No. 2009-176785, the port and the wire are provided such that the engine board can connect to both the apparatuses A and B, but a single motor driver control circuit cannot drive different types of motors in this configuration.

SUMMARY

The present disclosure is directed to providing a board capable of controlling different types of motors with a single motor driver control circuit.

According to an aspect of the present disclosure, a board includes a motor driver control circuit including a first H-bridge and a second H-bridge, a first connector to which an output from the first H-bridge and an output from the second H-bridge are to be input, a first wire and a second wire configured to input the output from the first H-bridge to the first connector, a third wire and a fourth wire configured to input the output from the second H-bridge to the first connector, and a fifth wire connected to the first wire and configured to output the first H-bridge output to another connector, and a sixth wire connected to the second wire and configured to output the first H-bridge output to the other connector.

Further features of the present disclosure will become apparent from the following description of exemplary embodiments with reference to the attached drawings.

BRIEF DESCRIPTION OF THE DRAWINGS

FIGS. 8A, 8B, and 8C illustrate a configuration for identifying whether a printer is the monochrome printer or the color printer.

DESCRIPTION OF THE EMBODIMENTS

With reference to the drawings, exemplary embodiments for carrying out the present disclosure will be described. An example will be described where a board according to the present disclosure is applied to a color printer and a monochrome printer.

First Exemplary Embodiment

Figure 1:
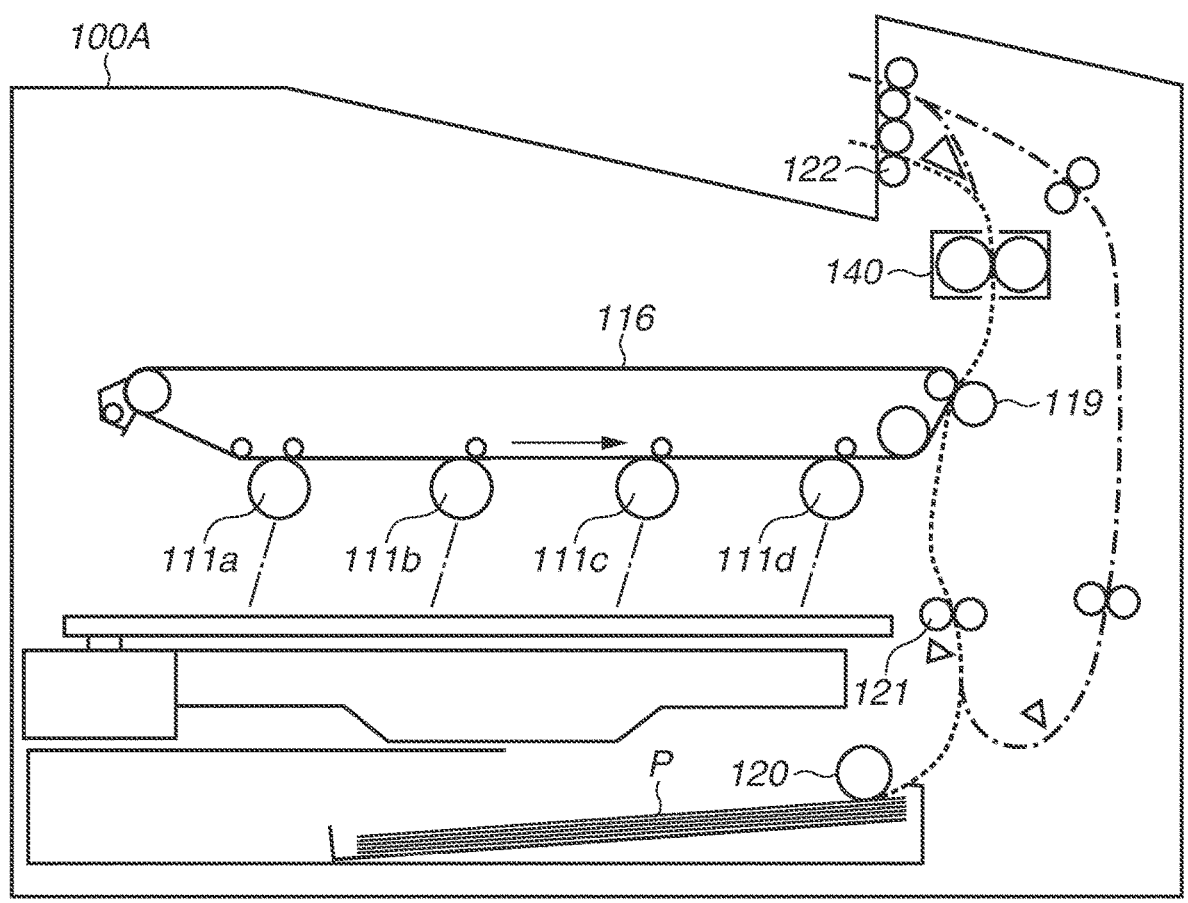
FIG. 1 is a cross-sectional view illustrating a general configuration of a color printer.

FIG. 1 is a cross-sectional view illustrating the general configuration of a color printer 100A.

In FIG. 1, a recording sheet P stored in a cassette is fed by a sheet feeding roller 120 connected to a sheet feeding motor (not illustrated). The fed recording sheet P passes through a one-sided conveying path (a dashed line illustrated in FIG. 1) and is conveyed to a transfer position between an intermediate transfer belt 116 and a secondary transfer external roller 119 via registration rollers 121 that correct the skew of the recording sheet P. The recording sheet P having passed through the transfer position passes through a fixing device 140 that fixes an image on the recording sheet P. The recording sheet P is then discharged to outside the color printer 100A by sheet discharge rollers 122.

Process units 111a, 111b, 111c, and 111d correspond to four colors, namely yellow, magenta, cyan, and black. Each of the process units 111a, 111b, 111c, and 111d includes a photosensitive drum and a developing machine.

Figure 2:
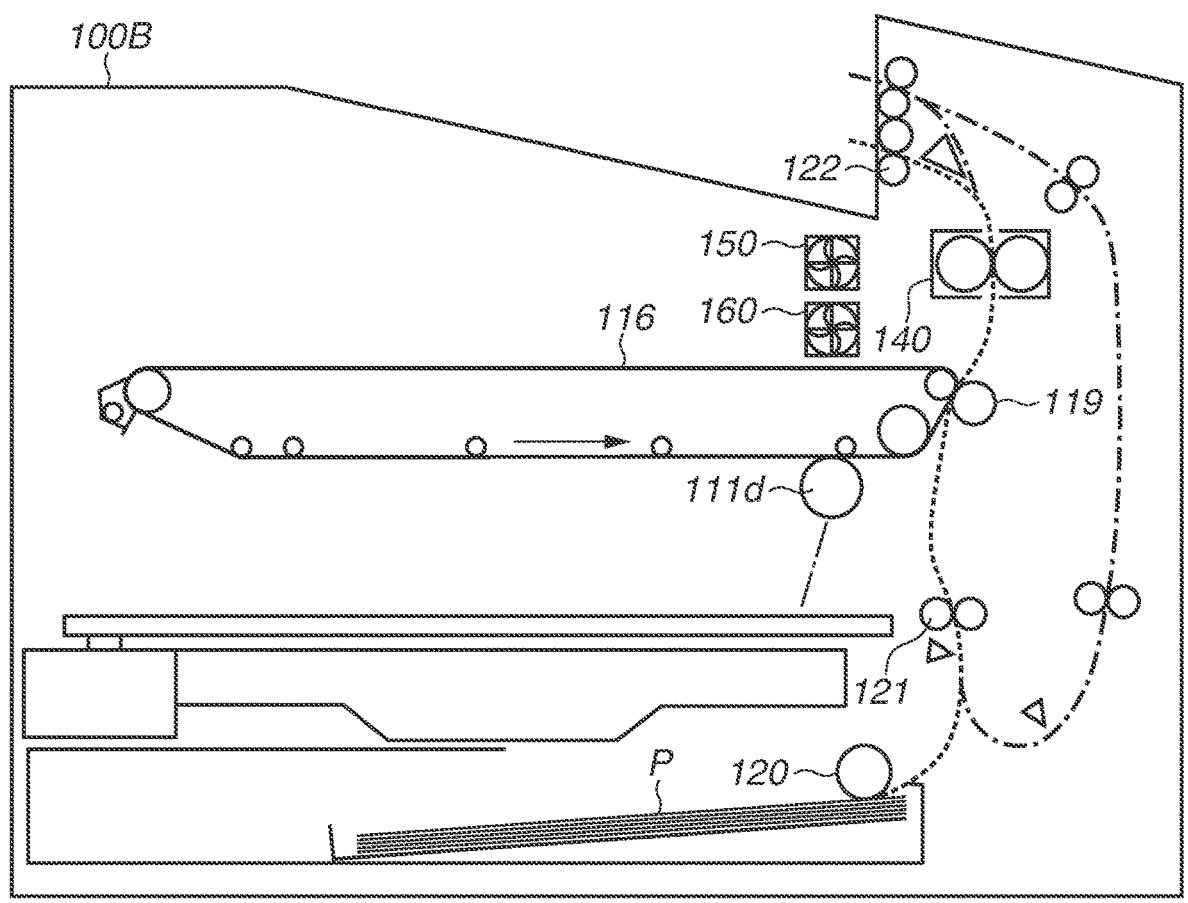
FIG. 2 is a cross-sectional view illustrating a general configuration of a monochrome printer.

FIG. 2 is a cross-sectional view illustrating the general configuration of a monochrome printer 100B.

The monochrome printer 100B according to a first exemplary embodiment is a model that does not include components unnecessary in a monochrome printer, such as the process units corresponding to yellow, magenta, and cyan that are included in the color printer 100A. Then, the monochrome printer 100B according to the present exemplary embodiment is a printer having a faster printing speed than that of the color printer 100A, and the temperature rise of motors and the fixing device 140 is larger than that of the color model. Thus, the monochrome printer 100B includes fan units 150 and 160. The process units 111a, 111b, 111c, and 111d and the fixing device 140 affect the image quality and the durability life depending on their ambient temperatures. In response, in the monochrome printer 100B, the ambient temperatures of the process unit 111d and the fixing device 140 are controlled using the fan units 150 and 160.

Figure 3:
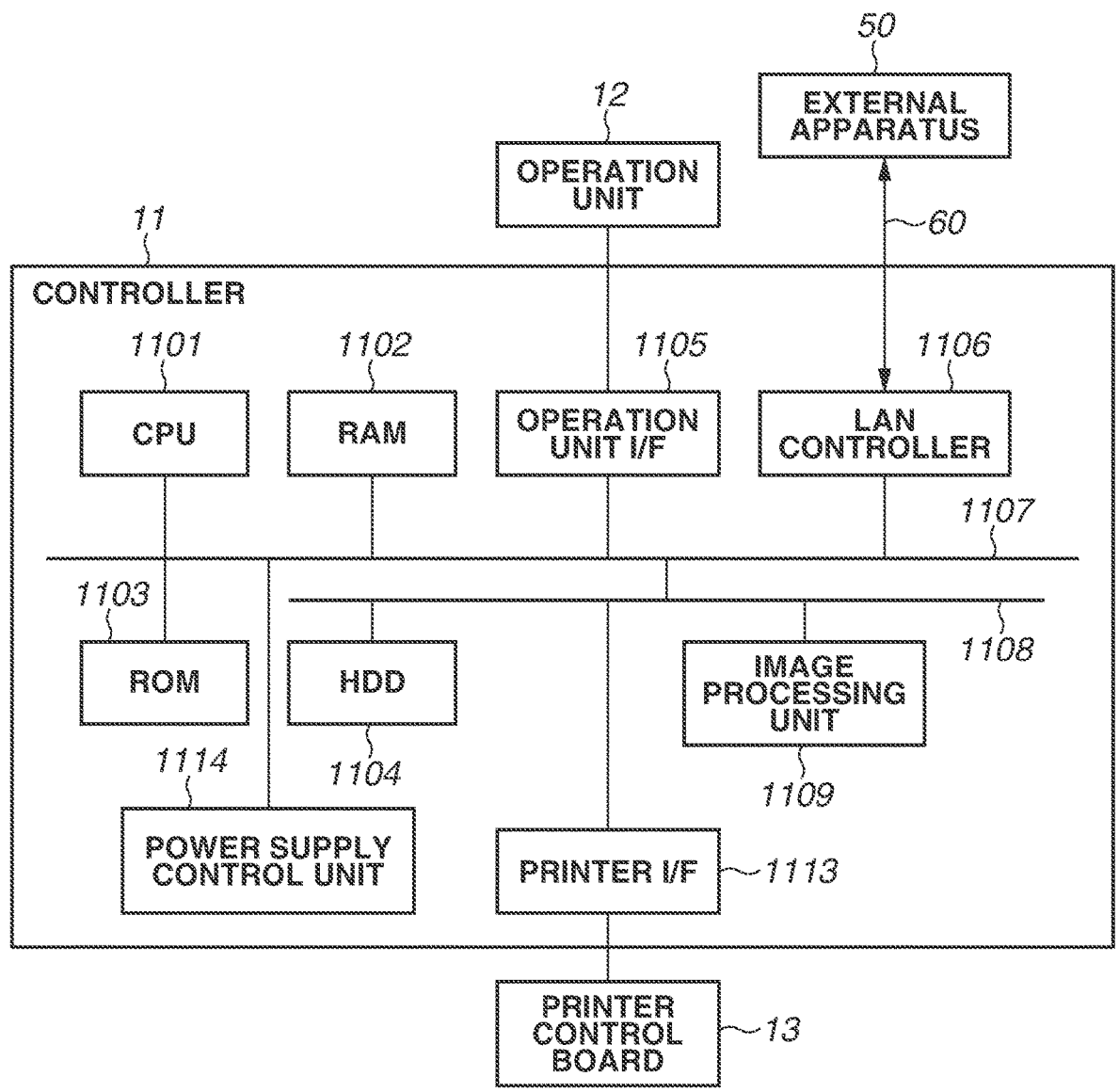
FIG. 3 is a block diagram illustrating a controller.

FIG. 3 is a block diagram illustrating a controller that controls a printer. With reference to FIG. 3, a description will be given of details of a controller 11 that controls the printer.

As illustrated in FIG. 3, the controller 11 is connected to a printer control board 13 and an operation unit 12. The controller 11 includes a central processing unit (CPU) 1101, a random-access memory (RAM) 1102, a read-only memory (ROM) 1103, an operation unit interface (I/F) 1105, a local area network (LAN) controller 1106, and a power supply control unit 1114. The CPU 1101, the RAM 1102, the ROM 1103, the operation unit I/F 1105, the LAN controller 1106, and the power supply control unit 1114 are connected to a system bus 1107. The controller 11 also includes a hard disk drive (HDD) 1104, an image processing unit 1109, and a printer I/F 1113. The HDD 1104, the image processing unit 1109, and the printer I/F 1113 are connected to an image bus 1108.

Based on, for example, a control program stored in the ROM 1103, the CPU 1101 performs overall control of access to various devices connected to the controller 11, and also performs overall control of various processes performed by the controller 11.

The RAM 1102 is a system work memory for the operation of the CPU 1101. The RAM 1102 is also a memory for temporarily storing image data. The RAM 1102 includes a static random-access memory (SRAM), which can hold a stored content even when the power supply is turned off, and a dynamic random-access memory (DRAM), from which a stored content is erased when the power supply is turned off. The ROM 1103 stores, for example, a boot program for the apparatus. The HDD 1104 is a hard disk drive that stores a program for controlling the printer, and image data.

The operation unit I/F 1105 is an interface unit for connecting the system bus 1107 and the operation unit 12. The operation unit I/F 1105 receives, from the system bus 1107, image data to be displayed on the operation unit 12, outputs the image data to the operation unit 12, and outputs information input from the operation unit 12 to the system bus 1107.

The LAN controller 1106 controls the input and output of information between the printer and an external apparatus 50 connected to a network 60.

The power supply control unit 1114 controls the supply of power to the components of the printer.

The image bus 1108, which is a transmission path for exchanging image data, includes a Peripheral Component Interconnect (PCI) bus and an Institute of Electrical and Electronics Engineers (IEEE) 1394 bus.

The image processing unit 1109 performs image processing. Specifically, the image processing unit 1109 reads image data stored in the RAM 1102 and performs image processing, such as the enlargement or reduction and the color adjustment of a Joint Photographic Experts Group (JPEG) image or a Joint Bi-level Image Experts Group (JBIG) image, on the image data.

The printer control board 13 controls the process units 111a, 111b, 111c, and 111d, the fixing device 140, various rollers, and various motors.

Figure 4:
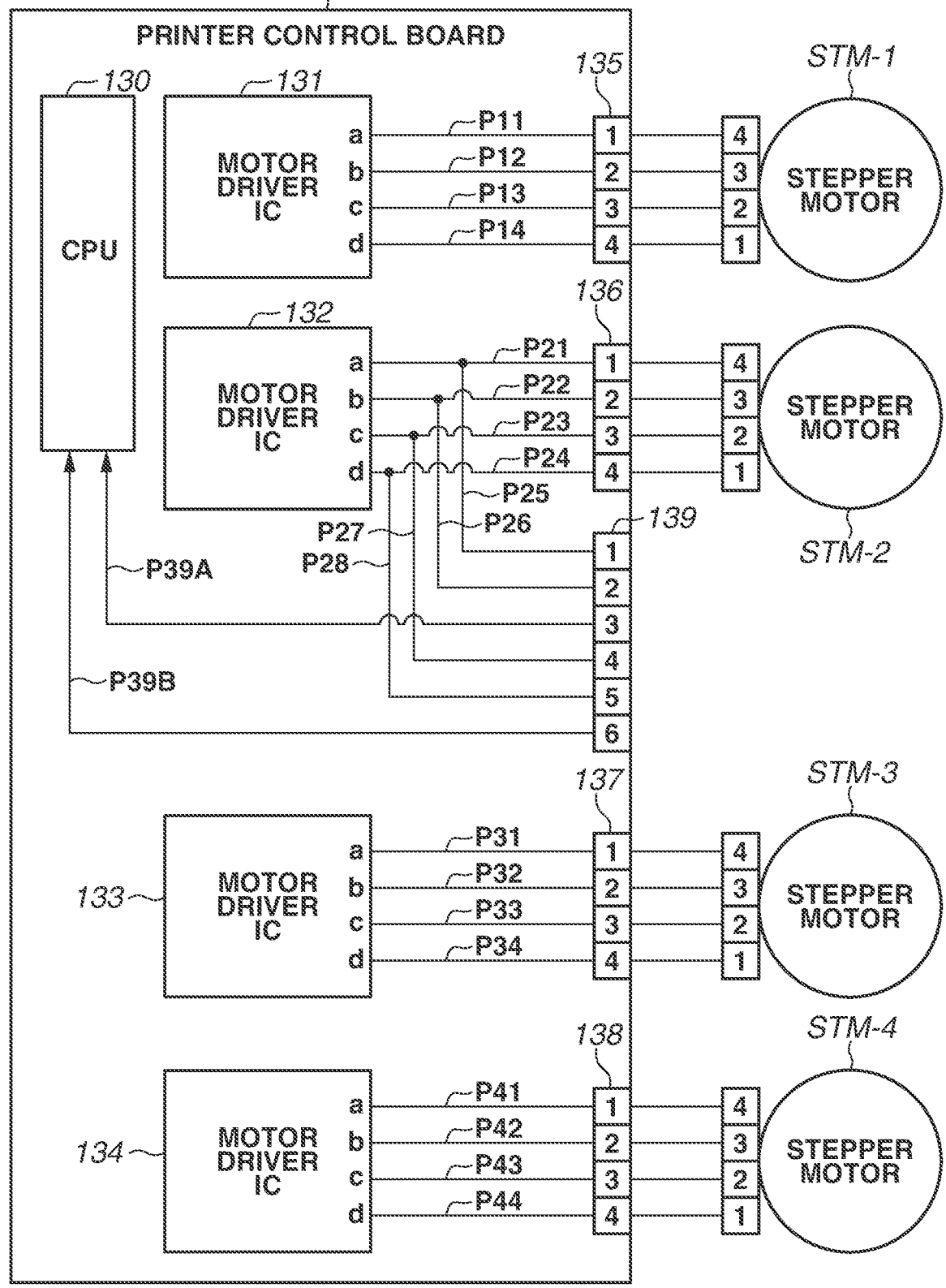
FIG. 4 is a diagram illustrating details of a printer control board of the color printer.

FIG. 4 is a diagram illustrating details of a printer control board of the color printer 100A.

Next, the printer control board provided in the color printer 100A will be described in detail with reference to FIG. 4.

A printer control board 13A of the color printer 100A includes a CPU (processor) 130 and a plurality of motor driver integrated circuits (ICs) (motor driver control circuits) 131, 132, 133, and 134. The printer control board 13A includes the motor driver ICs 131, 132, 133, and 134 that control stepper motors STM-1, STM-2, STM-3, and STM-4 of the developing machines corresponding to the four colors, namely yellow, magenta, cyan, and black, respectively. Details of the motor driver ICs 131, 132, 133, and 134 will be described below.

The printer control board 13A includes a connector 135 to which outputs a, b, c, and d from the motor driver IC 131 are input. The printer control board 13A also includes a connector 136 to which outputs a, b, c, and d from the motor driver IC 132 are input. The printer control board 13A also includes a connector 137 to which outputs a, b, c, and d from the motor driver IC 133 are input. The printer control board 13A also includes a connector 138 to which outputs a, b, c, and d from the motor driver IC 134 are input. The connectors 135, 137, and 138 are connectors to which four signals can be input.

Further, in the present exemplary embodiment, the printer control board 13A includes a connector 139 to which the outputs a, b, c, and d from the motor driver IC 132 are input.

On the printer control board 13A, a wire P21 and a wire P22 are formed. The wire P21 connects the output a from the motor driver IC 132 and a pin 1 of the connector 136. The wire P22 connects the output b from the motor driver IC 132 and a pin 2 of the connector 136. On the printer control board 13A, a wire P23 and a wire P24 are formed. The wire P23 connects the output c from the motor driver IC 132 and a pin 3 of the connector 136. The wire P24 connects the output d from the motor driver IC 132 and a pin 4 of the connector 136.

On the printer control board 13A, a wire P25 connected to the wire P21, a wire P26 connected to the wire P22, a wire P27 connected to the wire P23, and a wire P28 connected to the wire P24 are formed. However, loads are not connected to the connector 139 to which the wires P25 to P28 are connected.

The wires P21 to P28 are formed on the printer control board 13A as described above, whereby each of the outputs a, b, c, and d from the motor driver IC 132 is input to both the connectors 136 and 139.

On the printer control board 13A according to the present exemplary embodiment, a wire P39A and a wire P39B are formed. The wire P39A connects a pin 3 of the connector 139 and the CPU 130, and the wire P39B connects a pin 6 of the connector 139 and the CPU 130.

On the printer control board 13A, wires P11, P12, P13, and P14 that connect the motor driver IC 131 and the connector 135 are formed. On the printer control board 13A, wires P31, P32, P33, and P34 that connect the motor driver IC 133 and the connector 137 are formed. On the printer control board 13A, wires P41, P42, P43, and P44 that connect the motor driver IC 134 and the connector 138 are formed.

Figure 5:
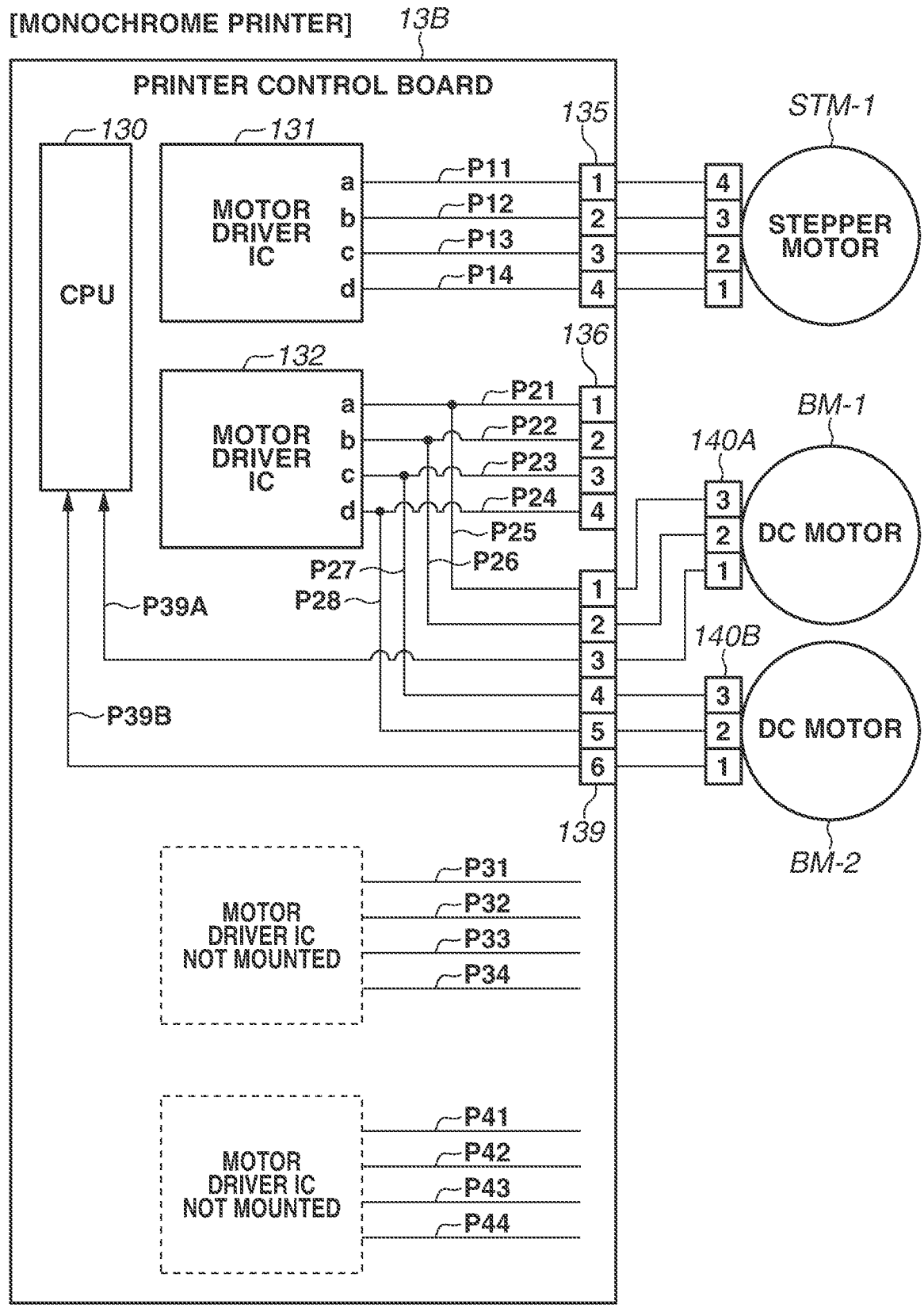
FIG. 5 is a diagram illustrating details of a printer control board of the monochrome printer.

FIG. 5 is a diagram illustrating details of a printer control board of the monochrome printer 100B.

Next, the printer control board provided in the monochrome printer 100B will be described in detail with reference to FIG. 5. A printer control board 13B provided in the monochrome printer 100B and the printer control board 13A provided in the color printer 100A are made common except for mounted components. That is, the motor driver ICs 133 and 134 and the connectors 137 and 138, which are mounted on the printer control board 13A of the color printer 100A, are not mounted on the printer control board 13B provided in the monochrome printer 100B. On the printer control board 13B, non-mounting areas where motor driver ICs can be mounted, the wires P21 to 24, the wires P31 to P34, and the wires P41 to P44 are provided.

The printer control board 13B of the monochrome printer 100B includes the CPU 130 and a plurality of motor driver ICs 131 and 132. The printer control board 13B includes the motor driver IC 131 that controls the stepper motor STM-1 of the developing machine corresponding to black. The printer control board 13B also includes the motor driver IC 132 that controls two direct current (DC) motors BM-1 and BM-2. The DC motors BM-1 and BM-2 are motors that drive fans, and are included in the fan units 150 and 160, respectively. The DC motors BM-1 and BM-2 each include a three-pin connector. Each of a pin 1 of a connector 140A of the DC motor BM-1 and a pin 1 of a connector 140B of the DC motor BM-2 is a pin for outputting a lock signal. A pin 3 of the connector 140A of the DC motor BM-1 is connected to a pin 1 of the connector 139, and a pin 2 of the connector 140A of the DC motor BM-1 is connected to a pin 2 of the connector 139. A pin 3 of the connector 140B of the DC motor BM-2 is connected to a pin 4 of the connector 139, and a pin 2 of the connector 140B of the DC motor BM-2 is connected to a pin 5 of the connector 139. The connector 140A of the DC motor BM-1 and the connector 139 are connected together by three wire rods. The connector 140B of the DC motor BM-2 and the connector 139 are connected together by three wire rods.

The pin 3 of the connector 139 is connected to the CPU 130 via the wire P39A, and the pin 6 of the connector 139 is connected to the CPU 130 via the wire P39B. The CPU 130 detects that the DC motor BM-1 is locked according to a signal input to the CPU 130 via the wire P39A. The CPU 130 detects that the DC motor BM-2 is locked according to a signal input to the CPU 130 via the wire P39B. When the DC motor BM-1 is locked, the CPU 130 is notified of a lock signal via the pin 1 of the connector 140A, the pin 3 of the connector 139, and the wire P39A. When the DC motor BM-2 is locked, the CPU 130 is notified of a lock signal via the pin 1 of the connector 140B, the pin 6 of the connector 139, and the wire P39B.

Similarly to the printer control board 13A, the printer control board 13B includes the connector 135 to which the outputs a, b, c, and d from the motor driver IC 131 are input. Similarly to the printer control board 13A, the printer control board 13B also includes the connector 136 to which the outputs a, b, c, and d from the motor driver IC 132 are input. However, loads are not connected to the connector 136. On the printer control board 13B, the connectors 137 and 138, which are mounted on the printer control board 13A, are not mounted. On the printer control board 13B, the motor driver ICs 133 and 134 are not mounted. On the printer control board 13B, the wires (P31 to P34 and P41 to P44), which are used when the motor driver ICs 133 and 134 are mounted, are formed.

Figure 6:
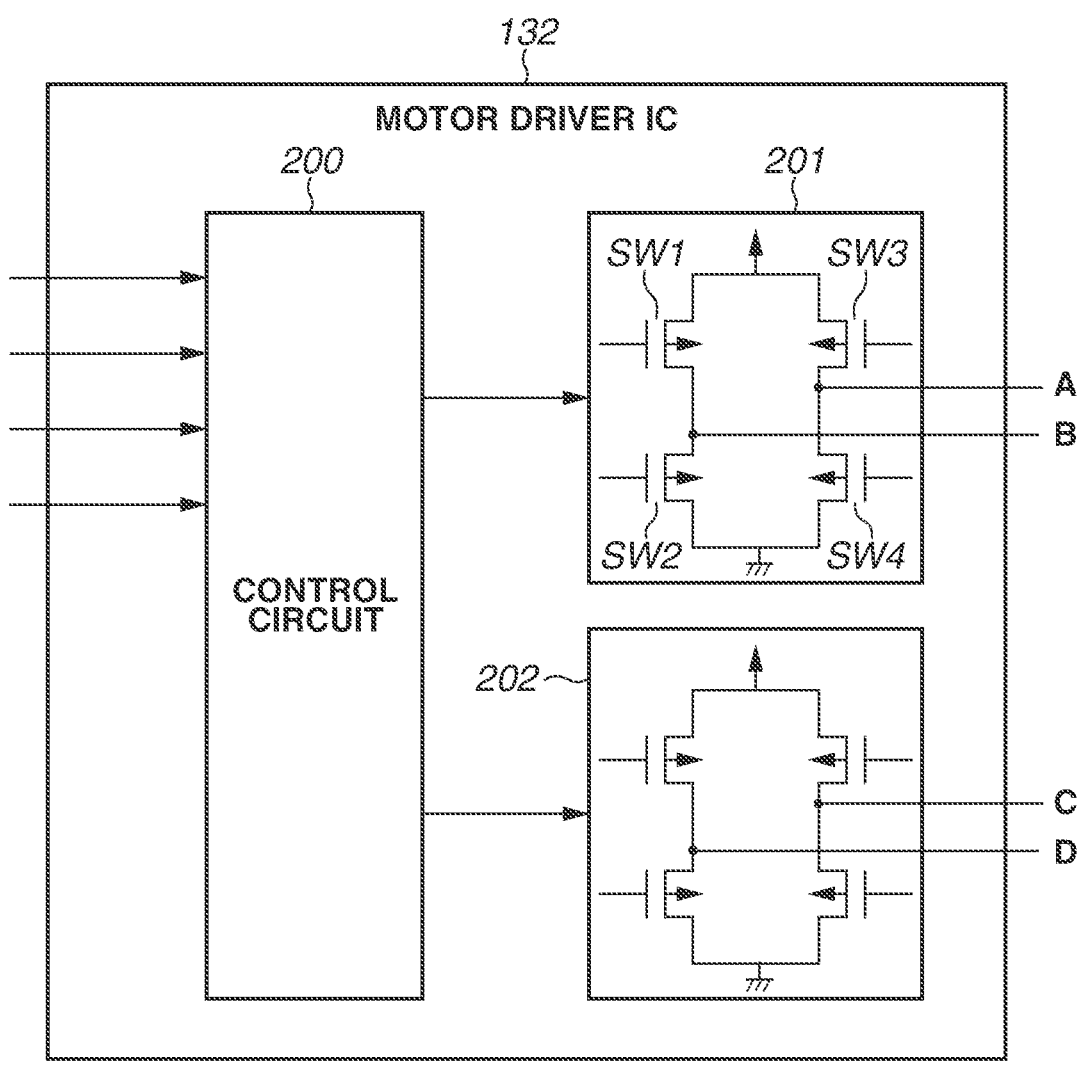
FIG. 6 is a diagram illustrating details of a motor driver integrated circuit (IC).

FIG. 6 is a diagram illustrating details of each motor driver IC. Details of the motor driver IC will be described with reference to FIG. 6.

The motor driver IC 132 drives the stepper motor STM-2 in the color printer 100A. The motor driver ICs 131, 133, and 134 have the same functions as those of the motor driver IC 131, and therefore the motor driver ICs will not be described. The motor driver IC 132 according to the present exemplary embodiment also drives both the DC motors BM-1 and BM-2 in the monochrome printer 100B.

The motor driver IC 132 includes a control circuit 200 and two H-bridge circuits 201 and 202. The H-bridge circuit 201 includes four switches (e.g., field-effect transistors) SW1, SW2, SW3, and SW4. The control circuit 200 outputs a control signal to each of the four switches SW1, SW2, SW3, and SW4. According to the control signals, the switches SW1, SW2, SW3, and SW4 are turned on or off. The H-bridge circuit 201 includes two power supply terminals A and B. The output a is output from the power supply terminal A, and the output b is output from the power supply terminal B.

Figure 7A:
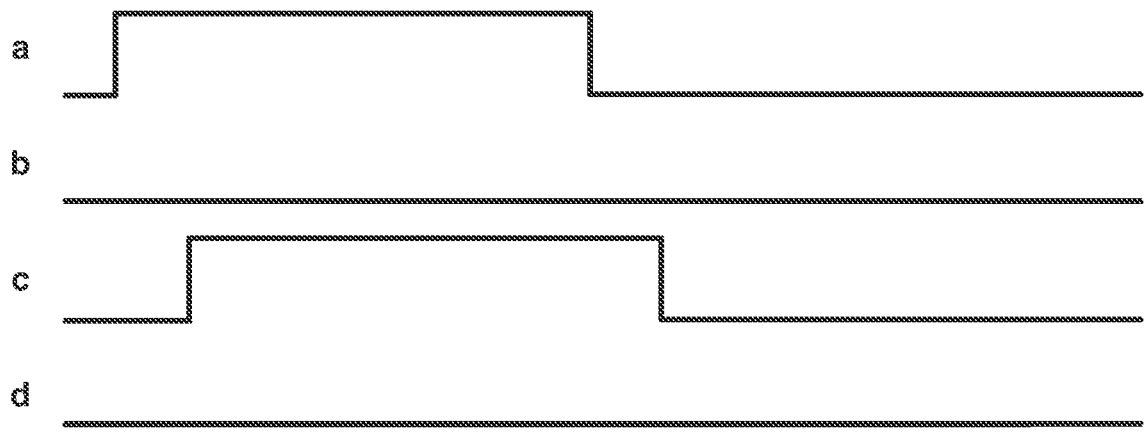
FIG. 7A illustrates driving waveforms of a direct current (DC) motor output from a motor driver IC.

The outputs a, b, c, and d from the power supply terminals A, B, C, and D, respectively, have waveforms as illustrated in FIG. 7A. In a case where the DC motor BM-1 is driven, voltages are applied to the two power supply terminals A and B. To connect the positive terminal of a DC power supply to one of the power supply terminals A and B, i.e., the power supply terminal A, and to connect the negative terminal of the DC power supply to the other power supply terminal B, the control circuit 200 turns on the switches SW1 and SW4 and turns off the switches SW2 and SW3. The DC motor BM-1 thereby rotates in a forward direction. To connect the negative terminal of the DC power supply to one of the power supply terminal A and B, i.e., the power supply terminal A, and connect the positive terminal of the DC power supply to the other power supply terminal B, the control circuit 200 turns on the switches SW2 and SW3 and turns off the switches SW1 and SW4. The DC motor BM-1 thereby rotates in a backward direction. If the switches SW1 and SW3 are turned off and the switches SW2 and SW4 are turned on, the motor BM-1 stops. The rotational directions of the DC motors BM-1 and BM-2 according to the present exemplary embodiment are only the forward directions, and the DC motors BM-1 and BM-2 do not rotate in the backward directions.

In a case where the DC motor BM-2 is driven, voltages are applied to the two power supply terminals C and D of the H-bridge circuit 202. The output c is output from the power supply terminal C, and the output d is output from the power supply terminal D. The H-bridge circuit 202 is a component similar to the H-bridge circuit 201, and therefore is not described.

In a case of driving the stepper motor STM-2, the two H-bridge circuits 201 and 202 are used. In general, a two-phase stepper motor includes coils A, B, A*, and B* in four channels. The power supply terminals A and B of the H-bridge circuit 201 correspond to the coils A and A*, respectively. The power supply terminals C and D of the H-bridge circuit 202 correspond to the coils B and B*, respectively. The direction of a current to be applied to each coil is changed in a stepwise manner, thereby driving the stepper motor STM-2.

Figure 7B:
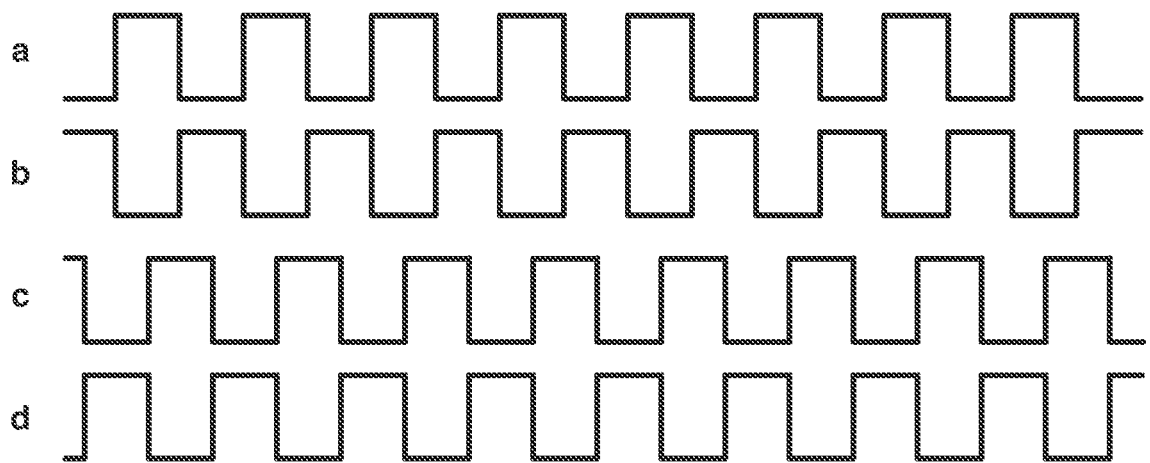
FIG. 7B illustrates driving waveforms of a stepper motor output from the motor driver IC.

In a case of driving the stepper motor STM-2, the outputs a to d from the power supply terminals A to D, respectively, have waveforms as illustrated in FIG. 7B.

FIGS. 8A to 8C are diagrams illustrating a configuration for identifying whether the printer is the monochrome printer 100B or the color printer 100A. A general-purpose input/output (IO) port P01 of the CPU 130 is a port assigned to identify the model of the printer. As illustrated in FIG. 8A, if the general-purpose IO port P01 is at a low level, the CPU 130 recognizes that the printer is the color printer 100A. If the general-purpose IO port P01 is at a high level, the CPU 130 recognizes that the printer is the monochrome printer 100B.

To the CPU 130 of the printer control board 13A, a circuit in which a resistor 311 is not mounted and a resistor 312 is mounted is connected. To the CPU 130 of the printer control board 13B, a circuit in which the resistor 311 is mounted and the resistor 312 is not mounted is connected.

Second Exemplary Embodiment

In the first exemplary embodiment, wires are formed such that the outputs a to d from the motor driver 132 branch to two connectors. In a second exemplary embodiment, the outputs a and b from the motor driver 132 do not branch.

Figure 9:
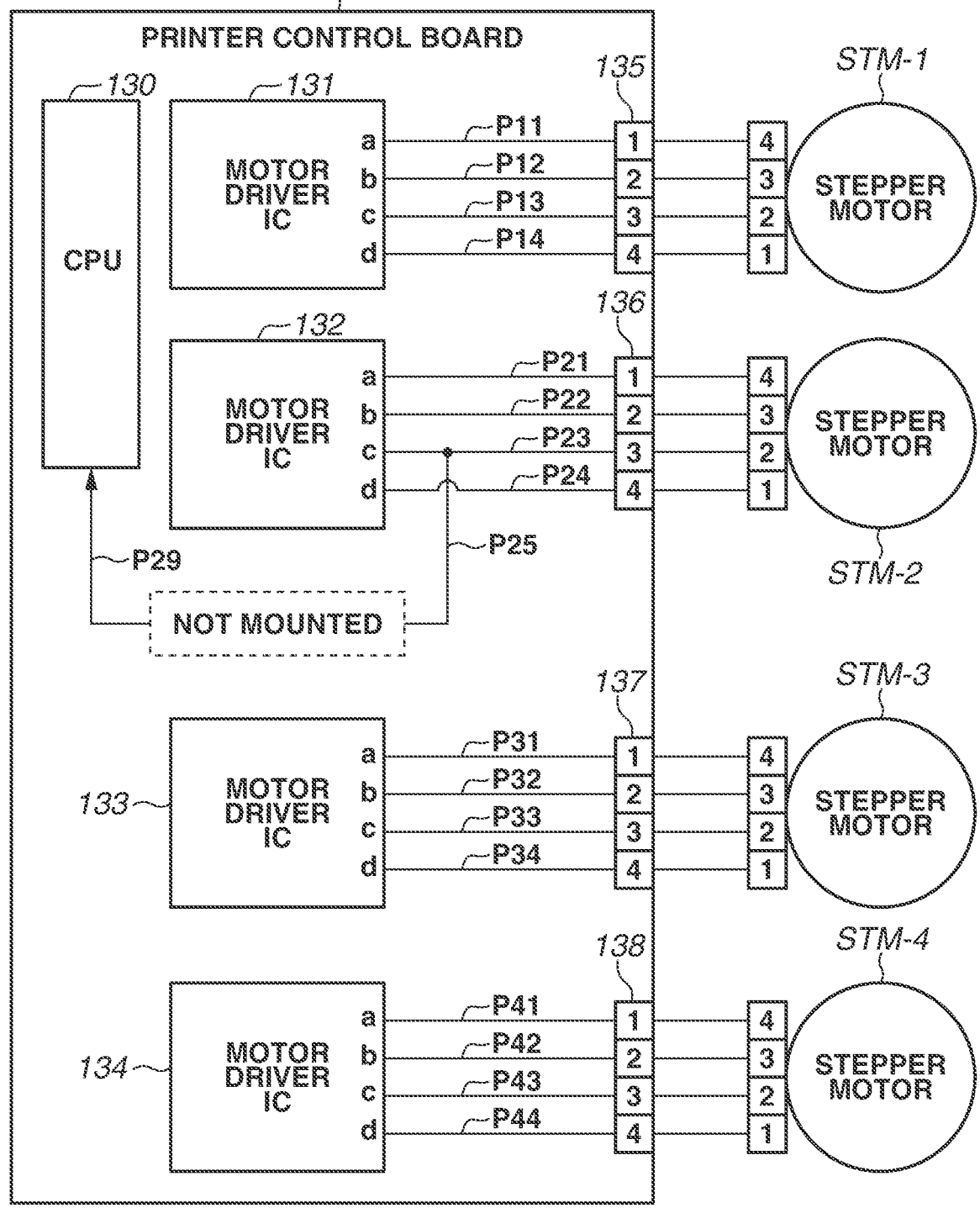
FIG. 9 illustrates details of a printer control board of a color printer according to a second exemplary embodiment.

FIG. 9 is a diagram illustrating details of a printer control board of a color printer according to the second exemplary embodiment. On a printer control board 113A, a wire P21 and a wire P22 are formed; the wire P21 connects an output a from a motor driver IC 132 and a pin 1 of a connector 136, and the wire P22 connects an output b from the motor driver IC 132 and a pin 2 of the connector 136. On the printer control board 113A, a wire P23 and a wire P24 are formed; the wire P23 connects an output c from the motor driver IC 132 and a pin 3 of the connector 136, and the wire P24 connects an output d from the motor driver IC 132 and a pin 4 of the connector 136. On the printer control board 113A, a wire P25 connected to the wire P23 and a wire P29 connected to a CPU 130 are formed. On the printer control board 113A, a connection circuit 170 that connects the wires P25 and P29 are not mounted.

Figure 10:
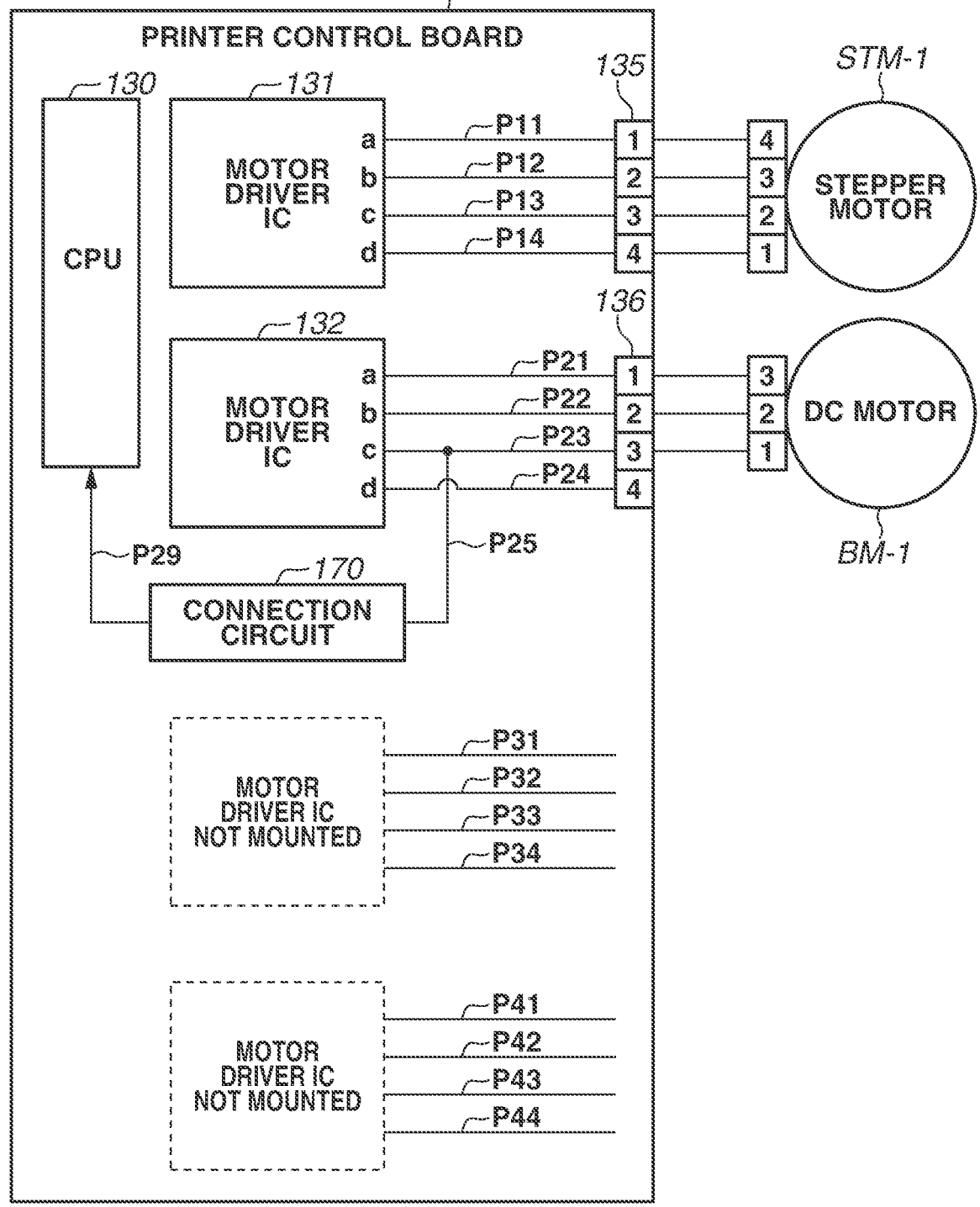
FIG. 10 illustrates details of a printer control board of a monochrome printer according to the second exemplary embodiment.

FIG. 10 is a diagram illustrating details of a printer control board of a monochrome printer according to the second exemplary embodiment. On a printer control board 113B of the monochrome printer, the connection circuit 170 that connects the wires P25 and P29 is provided. The connector 136 may be a three-pin connector.

Variations

In the above exemplary embodiments, a description has been given using a printer as an example. Alternatively, the board according to the present disclosure may be applied to an electronic device, such as a personal computer or a server.

In the above exemplary embodiments, a description has been given of a stepper motor that drives a developing machine. Alternatively, a stepper motor that drives another actuator, such as a photosensitive member, may be used.

In the above exemplary embodiments, a board capable of controlling a stepper motor has been described. Alternatively, as illustrated in FIG. 9, two DC motors may be controlled instead of the stepper motor STM-2. That is, the printer control board is a board capable of controlling both two DC motors and two DC motors including lock pins.

On the printer control boards 13A and 13B, both the wires P39A and P39B are formed. Alternatively, at least either one of the wires P39A or P39B may be formed.

In the first exemplary embodiment, a circuit for identifying the model of the printer is connected to the port P01 of the CPU 130, as illustrated in FIGS. 8A to 8C. Alternatively, the CPU 130 may receive information regarding the model of the printer from the controller 11. The CPU 130 may also include a memory that stores information regarding the model of the printer, or the CPU 130 may be able to refer to a memory that stores the information regarding the model of the printer.

Figure 11:
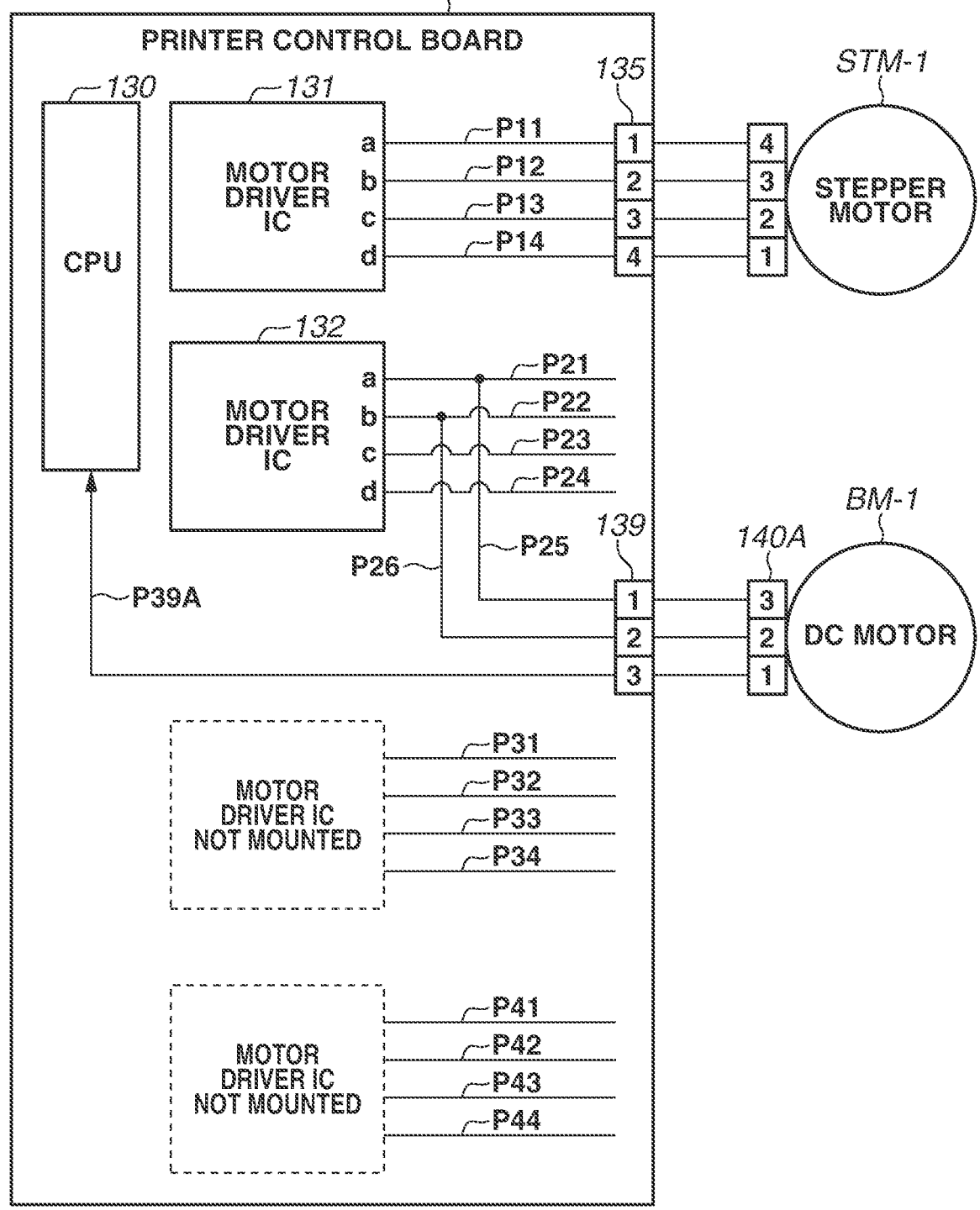
FIG. 11 illustrates details of a printer control board of a monochrome printer according to a variation.

An example has been described where the motor driver IC 132 drives two DC motors. Alternatively, the motor driver IC 132 may drive a single DC motor in the monochrome printer 100B as illustrated in FIG. 11.

In the monochrome printer 100B, the connector 136 may not be provided.

According to the present disclosure, it is possible to provide a board capable of controlling different types of motors with a single motor driver control circuit.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-043457, filed Mar. 12, 2020, which is hereby incorporated by reference herein in its entirety.

What is claimed is:

1. A board comprising:
a motor driver control circuit including a first H-bridge and a second H-bridge;
a first connector to which an output from the first H-bridge and an output from the second H-bridge are to be input;
a first wire and a second wire configured to input the output from the first H-bridge to the first connector;
a third wire and a fourth wire configured to input the output from the second H-bridge to the first connector; and
a fifth wire connected to the first wire and configured to output the first H-bridge output to another connector, and a sixth wire connected to the second wire and configured to output the first H-bridge output to the other connector.

2. The board according to claim 1, further comprising the other connector.

3. The board according to claim 1, further comprising:
a seventh wire connected to the third wire and configured to output the second H-bridge output to the other connector; and
an eighth wire connected to the fourth wire and configured to output the second H-bridge output to the other connector.

4. The board according to claim 1, further comprising:
a processor; and
a ninth wire configured to connect the other connector and the processor.

5. The board according to claim 4, further comprising a tenth wire configured to connect the other connector and the processor.

6. The board according to claim 1, further comprising:
another motor driver control circuit different from the motor driver control circuit and including a third H-bridge and a fourth H-bridge; and
a second connector to which an output from the third H-bridge and an output from the fourth H-bridge are to be input.

7. The board according to claim 1, wherein the motor driver control circuit is a motor driver control circuit configured to drive a motor that outputs a lock signal.

8. The board according to claim 1, wherein the motor driver control circuit is a motor driver control circuit configured to drive a stepper motor.

9. The board according to claim 1, further comprising a non-mounting area where a motor driver control circuit different from the motor driver control circuit can be mounted,
wherein at least four wires extending from the non-mounting area are formed in the non-mounting area.

10. An electronic device comprising:
a board having:
a motor driver control circuit including a first H-bridge and a second H-bridge;

a first connector to which an output from the first H-bridge and an output from the second H-bridge are to be input,
a first wire and a second wire configured to input the output from the first H-bridge to the first connector,
a third wire and a fourth wire configured to input the output from the second H-bridge to the first connector, and
a fifth wire connected to the first wire and configured to output the first H-bridge output to another connector, and a sixth wire connected to the second wire and configured to output the first H-bridge output to the other connector;
a stepper motor; and
a wire rod configured to connect the first connector and the stepper motor.

11. The electronic device according to claim 10, wherein the stepper motor is a motor configured to drive a developing machine of a printer.

12. An electronic device comprising:
a board having:
a motor driver control circuit including a first H-bridge and a second H-bridge;
a first connector to which an output from the first H-bridge and an output from the second H-bridge are to be input,
a first wire and a second wire configured to input the output from the first H-bridge to the first connector,
a third wire and a fourth wire configured to input the output from the second H-bridge to the first connector, and
a fifth wire connected to the first wire and configured to output the first H-bridge output to another connector, and a sixth wire connected to the second wire and configured to output the first H-bridge output to the other connector;
a first direct current (DC) motor;
a second DC motor;
three wire rods configured to connect the first DC motor and the other connector; and
three wire rods configured to connect the second DC motor and the other connector.

13. The electronic device according to claim 12, wherein the first DC motor is a motor configured to drive a fan.

* * * * *